United States Patent
Visser et al.

(10) Patent No.: US 8,493,726 B2
(45) Date of Patent: Jul. 23, 2013

(54) ELECTRONIC DEVICE COMPRISING A FLEXIBLE DISPLAY WITH EDGE PROTECTORS

(75) Inventors: Hendrik Dirk Visser, Eindhoven (NL); Johannes Cornelis Adriaan Hamers, Breugel (NL); Michael Johannes Anna Maria Walters, Eindhoven (NL); David Johannes Elisabeth Bemelmans, Eindhoven (NL)

(73) Assignee: Creator Technology B.V., Breda (NL)

( * ) Notice: Subject to any disclaimer, the term of this patent is extended or adjusted under 35 U.S.C. 154(b) by 147 days.

(21) Appl. No.: 12/597,301

(22) PCT Filed: Apr. 25, 2008

(86) PCT No.: PCT/NL2008/050248
§ 371 (c)(1),
(2), (4) Date: May 19, 2010

(87) PCT Pub. No.: WO2008/133510
PCT Pub. Date: Nov. 6, 2008

(65) Prior Publication Data
US 2010/0246113 A1 Sep. 30, 2010

Related U.S. Application Data

(60) Provisional application No. 60/913,952, filed on Apr. 25, 2007.

(51) Int. Cl.
*H05K 5/00* (2006.01)
*H05K 7/00* (2006.01)
*H04M 1/00* (2006.01)

(52) U.S. Cl.
USPC .............. 361/679.3; 361/679.05; 361/679.06; 361/679.27; 455/575.3

(58) Field of Classification Search
USPC ............. 361/679.01, 679.02, 679.08, 679.09, 361/679.3, 679.55–679.59; 345/156, 157, 345/168, 169
See application file for complete search history.

(56) References Cited

U.S. PATENT DOCUMENTS

| 6,016,176 A | 1/2000 | Kim et al. |
| 7,724,508 B2 * | 5/2010 | Bemelmans et al. .... 361/679.09 |

(Continued)

FOREIGN PATENT DOCUMENTS

| JP | 2006-287982 | 10/2006 |
| WO | WO 02/33685 A | 4/2002 |

(Continued)

OTHER PUBLICATIONS

International Search Report for PCT/NL2008/050248 dated Nov. 4, 2008.

(Continued)

*Primary Examiner* — Zachary M Pape
*Assistant Examiner* — Jerry Wu

(57) ABSTRACT

The invention relates to an electronic device 60 comprising a flexible display arranged to be alternated between a collapsed state and an extended state, said flexible display comprising edge portions, the flexible display being further provided with an edge protector cooperating with the edge portions, wherein the edge protector is conceived to be alternated between a collapsed state and an extended state. In the electronic device 60a the flexible display 65 is conceived to be wound about a roller 61. The edge protector comprises rigid segments 63a, 63b, 63c, 62a, 62b, 62c, 62c interconnected by suitable means 64a, 64b, 64c. Wiring, pins, bars may be used for interconnecting means 64a, 64b, 64c. In the embodiment 60a an extended position of the edge protector is shown. In the embodiment 60b a collapsed state of the edge protector is shown comprising aggregations of segments 62', 62". The bars 64a, 64b, 64c partly protect the back surface of the display. The invention further relates to the electronic device comprising a flexible display wherein the flexible display is provided with an edge protector attached at least partially to the edge portions of the flexible display.

10 Claims, 12 Drawing Sheets

U.S. PATENT DOCUMENTS

| | | |
|---|---|---|
| 2002/0118151 A1 | 8/2002 | Chen |
| 2006/0077118 A1* | 4/2006 | Huang et al. .................. 345/1.3 |
| 2006/0194619 A1 | 8/2006 | Wilcox et al. |
| 2006/0232578 A1* | 10/2006 | Reinhorn ..................... 345/211 |
| 2010/0164973 A1 | 7/2010 | Huitema et al. |

FOREIGN PATENT DOCUMENTS

| | | |
|---|---|---|
| WO | WO 03/019349 | 3/2003 |
| WO | WO 2004/114259 A | 12/2004 |
| WO | WO 2006/085271 A2 | 8/2006 |
| WO | WO 2007/012899 | 2/2007 |

OTHER PUBLICATIONS

Japan Patent Office, Office Action, Patent Application Serial No. 2010-506101, Oct. 30, 2012, Japan.

* cited by examiner

ELECTRONIC DEVICE COMPRISING A FLEXIBLE DISPLAY WITH EDGE PROTECTORS

FIELD OF THE INVENTION

The invention relates to an electronic device comprising a flexible display arranged to be alternated between a collapsed state and an extended state, said flexible display comprising edge portions, the flexible display being further provided with an edge protector cooperating with the edge portions.

BACKGROUND OF THE INVENTION

An embodiment of an electronic device comprising a flexible display is known from WO 2004/114259. The known electronic device relates to a display device comprising an extendable, notably rollable display, provided with an extendable side member. The known extendible side member is arranged for providing support and structural rigidity to the display. The known side member is also arranged to provide a solid edge of the known display device, notably for protecting potentially delicate edge of a display material. In the known display device the display area and the side member conceived to cooperate with the edge portions thereof are stored separately in a housing of the device. In fact, the known display is wound around a suitable roller, whereas the side member is shoved into internal storage channels provided inside the housing next to the roller and substantially parallel to it. It will be appreciated that in the construction of the known display device while the flexible display is translated substantially in parallel to its plane, the side members undergo a 90 degree bend when being alternated between a storage position and the extended position.

It is a disadvantage of the known display device in that the side members undergo substantial mechanical stress during a process of extending and collapsing. This may lead to a material fatigue causing its breaking. In addition, due to the fact that the storage channels are provided internally it is not possible to carry out necessary maintenance procedures, like cleaning of the channels, potentially leading to generation of substantial amount of particles in the channels which may destroy the edge of the flexible display when in contact with the edge portions thereof.

SUMMARY OF THE INVENTION

It is an object of the invention to provide an electronic device comprising a flexible display wherein the edge portions of the flexible display are protected by means of edge protectors of improved quality.

To this end in the electronic device according to the invention the edge protector comprises a plurality of rigid segments.

It is found to be advantageous to provide the edge protector with the rigid segments so that the rigidity is not compromised due to collapsing of the edge protector. It is noted that in the known device this feature cannot be enabled due to the fact that the known side member has to undergo a 90 degree bend along its entire length when being moved to the storage position. Therefore, for the known side member a limited choice of flexible materials is available on one hand, and the mechanical rigidity is reduced due to the fact that the known side member has to be bent at every position along its length. Also, when the known side member is being stored for a considerable time it may be permanently deformed. This may lead to a stagnation of the side member inside the storage channels, or to loosing cooperation with the edge portion because the side members have taken a convex shape with respect to the straight edge portion of the flexible display. It will be appreciated that the edge protector according to the invention is capable of supporting increased mechanical loads compared to the known side member because the edge protector comprises rigid portions that do not undergo any deformation while being alternated between a collapsed state and the extended state.

In an embodiment of the electronic device according to the invention the edge protector is being deformed at a predetermined position along the edge protector during collapsing or extension.

It is found to be advantageous to envisage predetermined positions whereat the edge protector having is conceived to be deformed. This feature further elaborates a concept of the edge protector comprising rigid segments, as provision has to be made for deformation only at preselected points along a length of the edge protector. It will be appreciated that the term deformation comprises any alternation of the initial geometric shape with respect to a position substantially along an edge portion of the flexible display. Accordingly, the edge protector according to the invention may preferably comprise a suitable plurality of segments, which, may be moved in a telescopic way with respect to each other. In another embodiment of the edge protector according to the invention, the segments of the edge protector may be arranged as drawers having an area substantially corresponding to an area of the flexible display. This feature has an additional advantage of providing protection to the whole area of the flexible display, not just at the areas corresponding to edge portions thereof, resulting in a suitable protection of a back surface of the flexible display. In another embodiment, the rigid segments may comprise at least one flexile region conceive to be deformed during collapsing or extension of the flexible display.

In a further embodiment of the electronic device according to the invention the segments are foldable in a direction transverse to a direction of collapsing.

This feature provides a particularly easy to maintenance variant of the electronic device, wherein the segments may be collapsed at the exterior of the housing of the electronic device providing a compact structure that can easily be accessed for cleaning purposes, for example.

In a further embodiment of the electronic device according to the invention, the edge protector comprises two substantially rigid bodies interconnected by a hinge.

In this embodiment substantially rigid left and right arms of the edge protector can be straightened from their storage position along the sides of the flexible display for protection and can be folded away for storage. Such edge protector is preferably arranged to be positioned substantially abutting the side face of the flexible display, preventing it from deformation. More preferably, the rigid bodies are U-shaped for receiving at least a part of the edge portion of the flexible display. This enables in addition a bearing functionality for the edge protector due to the fact that at least a part of the weight of the flexible display is supported by the edge protector. These embodiments are characterized by surprisingly low production costs.

In a further embodiment of the electronic device according to the invention the flexible display is being housed in a cover arranged to be wrappable around a body of the electronic device, the cover comprising the edge protector with flexible areas at positions of cover deformation. The cover is further arranged to provide suitable protection to the back surface of the display.

In this embodiment of the electronic device according to the invention the flexible display is supported in most of its entirety by the protective cover, whereby the edge portions comprise flexible and rigid portions, the flexible portions being arranged for enabling the wrapping functionality providing necessary degree of freedom for the movement of the flexible display while being translated between a collapsed state and the extended state.

In a further embodiment the electronic device according to the invention comprises a mechanism for providing a substantially parallel guidance to the flexible display during collapsing and/or extension.

Preferably, per-se known scissor mechanism comprising two parallel bases interconnected by a sliding frame is used. The mechanism is arranged below the flexible display and is used to protect the display against undesired folding. In addition the mechanism shields the back side of the display. It is advantageous to use such mechanism in combination with the flexible display as it provides parallel guidance that minimized freedom of movement in substantially all directions except in the direction of collapsing and extension. Preferably, in the electronic device according to the invention the flexible device is arranged to be wound around a roller when in a collapsed state.

These and other aspects of the invention will be described in further detail with reference to figures.

DETAILED DESCRIPTION

Figure 1:
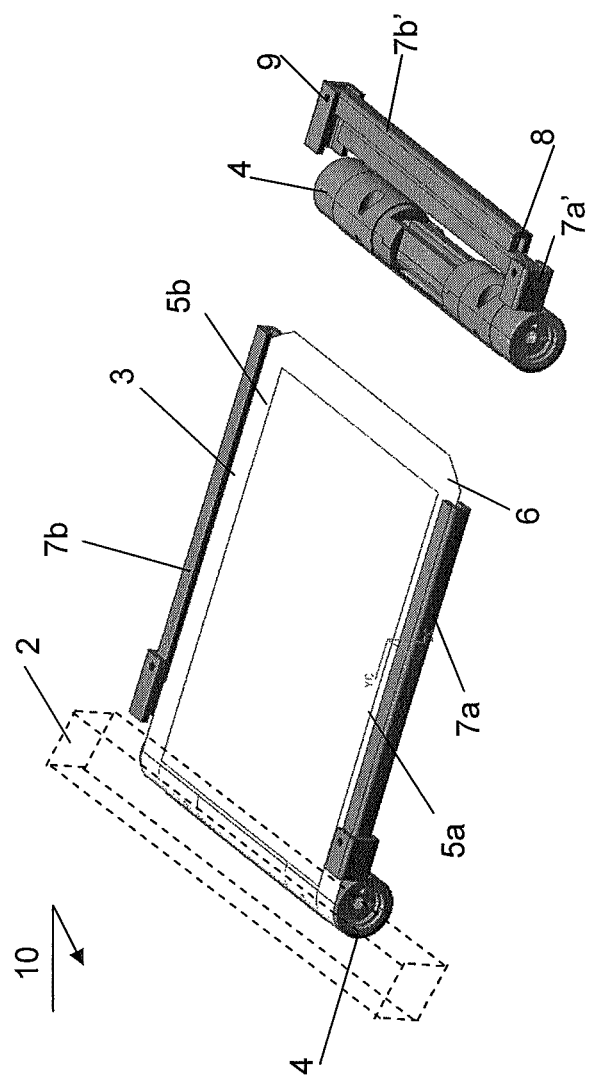
FIG. 1 presents a schematic view of an embodiment of the electronic device according to the invention.

FIG. 1 presents a schematic view of an embodiment of the electronic device according to the invention. The electronic device 10, notably a miniature portable computer, like a palm-note, a telephone, or the like comprises a housing 2 wherein a flexible display 6 can be stored when not in use. The flexible display 6 is preferably realized as a rollable display, which is conceived to be wound around a suitable roller 4. The flexible display 6 is preferably realized using electrophoretic technology. The flexible display comprises edge regions, like area 3. Although this area is not referred to as active display area, damage occurring at the area 3 may cause malfunction of the whole device. The edge portions are particularly vulnerable to damage resulting from bending at sharp radius, scratching and the like. The electronic device 10 according to the invention comprises the edge protector 7a, 7b arranged to be alternated between a collapsed state, (see 7a', 7b') and an extended state 7a, 7b. It is noted that in the collapsed state the edge protector arms 7a, 7b are stored at an exterior of the housing of the electronic device and can easily be accessed for cleaning or other suitable maintenance operations. The edge protector arms 7a, 7b are connected by a hinge 9 enabling a smooth movement of the arms 7a, 7b while extending or collapsing the flexible display. In the most simple embodiment of the electronic device according to the invention, the edge protector arms 7a, 7b comprise bars of a rigid material, like a molded plastic, metal, glass or the like. The arms 7a, 7b substantially abut a side face (not shown) of the flexible display 6. In another embodiment of the electronic device according to the invention the arms 7a, 7b are U-shaped for receiving a part of the edge portion 3 of the flexible display 6. In this way the flexible display is also supported by the arms 7a, 7b of the edge protector and is, therefore, immobilized with respect to transverse deformations. Due to this feature the durability of the flexible display is substantially improved.

Figure 2:
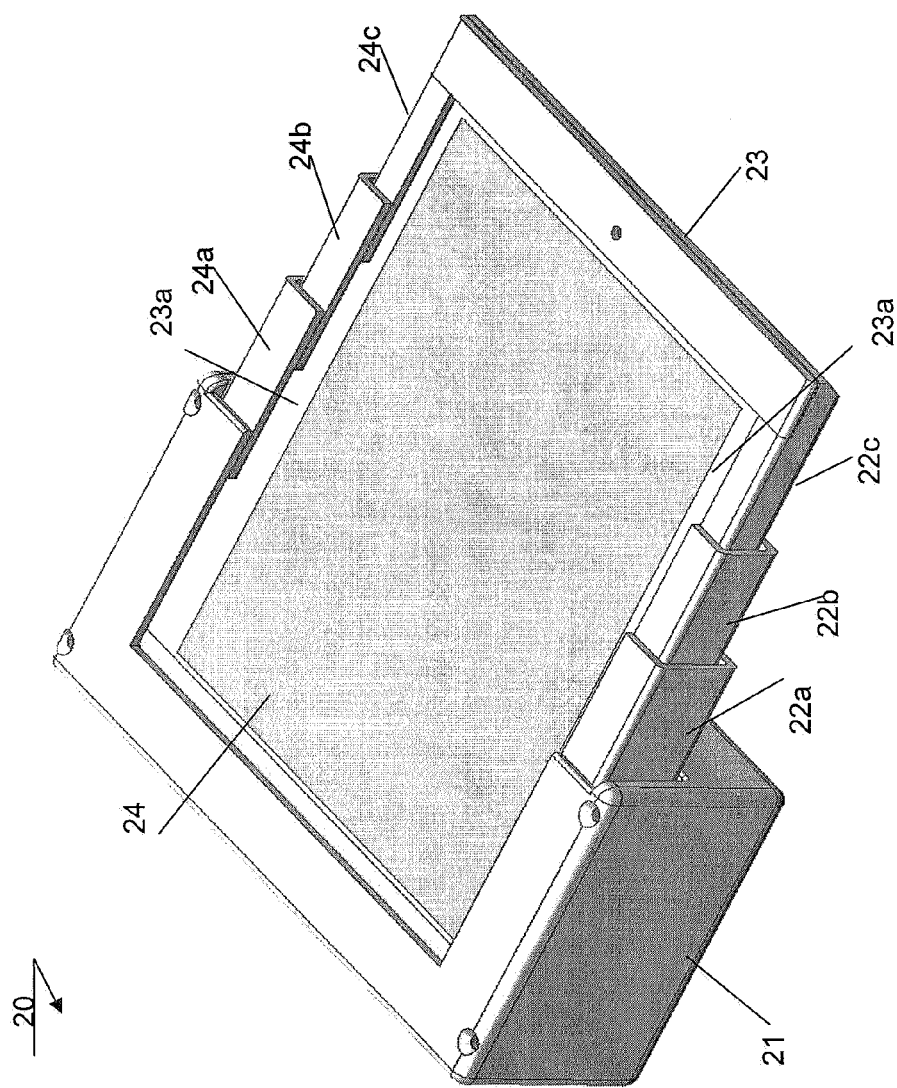
FIG. 2 presents a schematic view of a further embodiment of the electronic device according to the invention.

FIG. 2 presents a schematic view of a further embodiment of the electronic device according to the invention. The electronic device 20 comprises a housing 21 wherein all necessary electronics is positioned. The flexible display 24 is arranged to be stored in the housing 21 when collapsed. The edge portions 23a of the flexible display 24 are protected by the edge protector comprising segments 24a, 24b, 24c, 22a, 22b, 22c. The segments are arranged to receive a part of the edge portion 23a. Additionally a leading edge protector 23 is envisaged. The leading edge protector may also be used for providing grip for translating the flexible display 24. The edge protectors 24a, 24b, 24c, 22a, 22b, 22c are arranged to displace in a telescopic way with respect to each other. In this way the edge protector can easily be collapsed and stored, for example partially inside the housing 21. Due to the fact that the edge protector is not conceived to be bent, it can be manufactured from a rigid material thereby reducing production costs and increasing durability of the electronic device 20.

Figure 3:
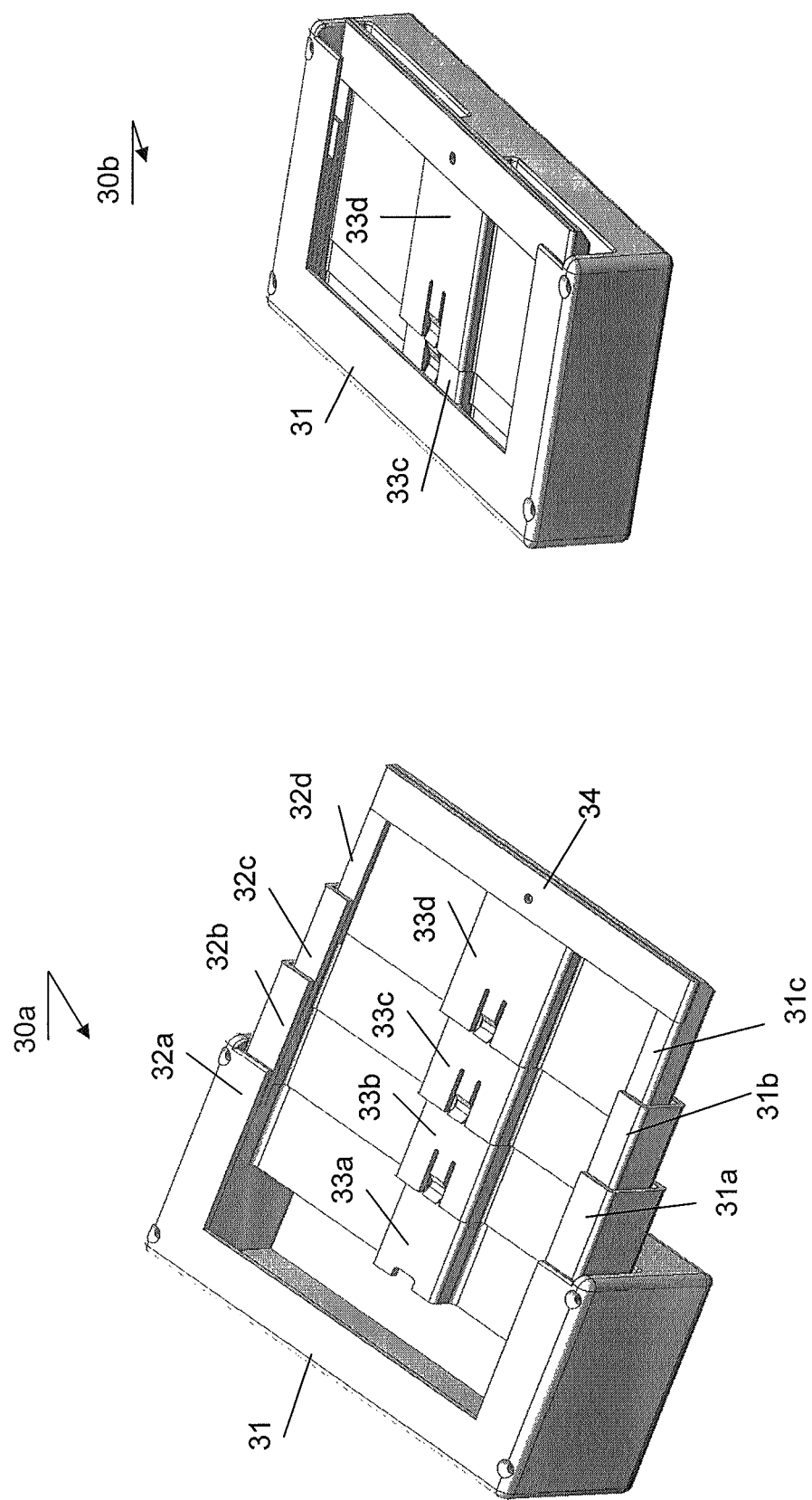
FIG. 3 presents a further schematic view of the embodiment of the electronic device according to the invention, shown in FIG. 2.

FIG. 3 presents a further schematic view of the embodiment of the electronic device according to the invention, shown in FIG. 2. In this embodiment the electronic device 30a comprises the edge protector implemented as a plurality of telescopically arranged drawers. A length of the drawer corresponds to a length of the segment 32a, 32b, 32c, 32d. Preferably, the segments have the same length; however, it is possible to provide the edge protector with segments of different lengths. This may be advantageous when the flexible display (not shown) is to be extended often over a portion of its active area, for example for checking a status of the electronic device, an incoming message, or the like. Preferably, each drawer is provided with a mechanism 33a, 33b, 33c, 33d for cooperating with a neighboring drawer and for securing that the weight of each drawer is distributed in a plane of the flexible display. Furthermore, this mechanism enables a user experienced "click" indicating the end position is reached or abandoned and, also this mechanism can prevent the drawers to be excessively opened. This feature improves mechanical stability of the electronic device. In addition, it is an advantage of the drawers that the whole back area of the flexible device is protected. In case when the drawers are manufactured from a solid material, the flexible display is also protected from small particles. In case when the drawers are manufactured from a perforated material to decrease weight, an inner surface of the drawer (not shown) may be covered with a protective layer to inhibit small particles from entering inside the housing 31. A view 30b is presented to illustrate the collapsed state of the electronic device according to the invention.

Figure 4:
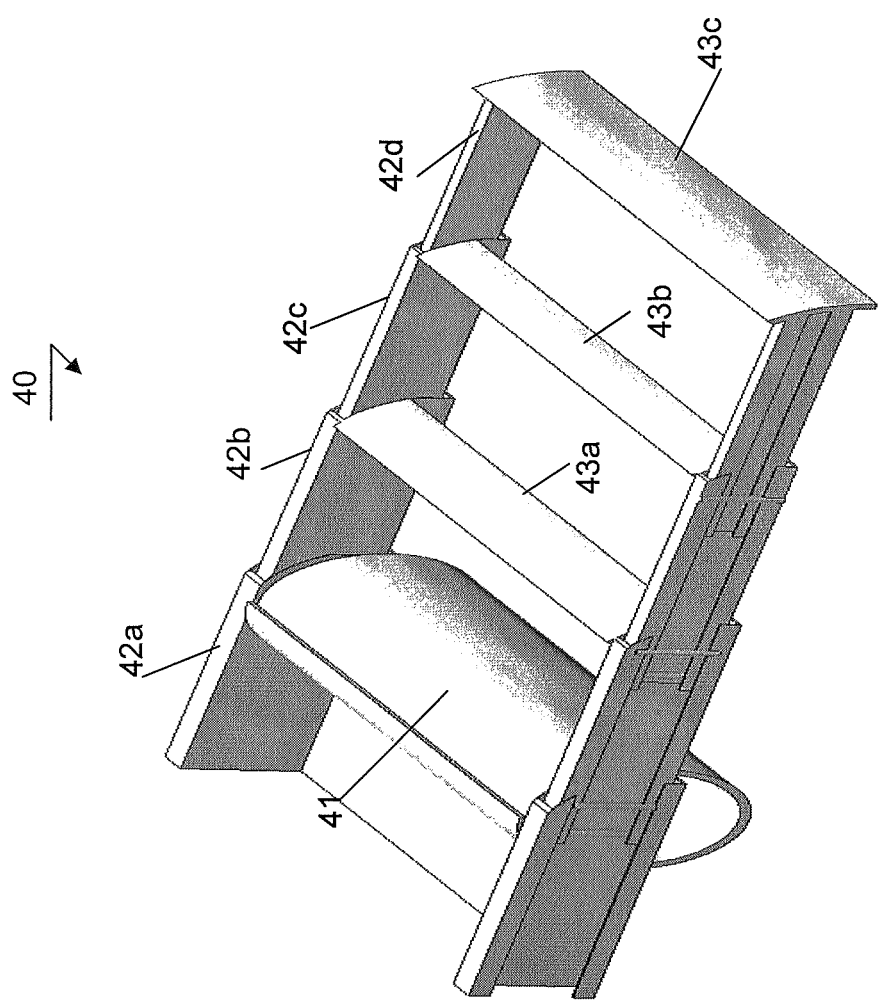
FIG. 4 presents a schematic view of a still further embodiment of the electronic device according to the invention.

FIG. 4 presents a schematic view of a still further embodiment of the electronic device according to the invention. In this embodiment the edge protector is frame based and comprises segments 42a, 42b, 42c, 42d interconnected with their counterparts by means of bars 43a, 43b, 43c, The segments 42a, 42b, 42c, 42d are telescopically arranged with respect to each other. The flexible display (not shown) is conceived to be wound around a suitable roller 41. It is an advantage of this particular embodiment of the electronic device 40 according to the invention that a compact collapsible edge protector is provided for protecting an edge portion of the display, said edge protector does not deform during use. Furthermore due to the bars 43a, 43b, 43c the display is partially protected from the back.

Figure 5:
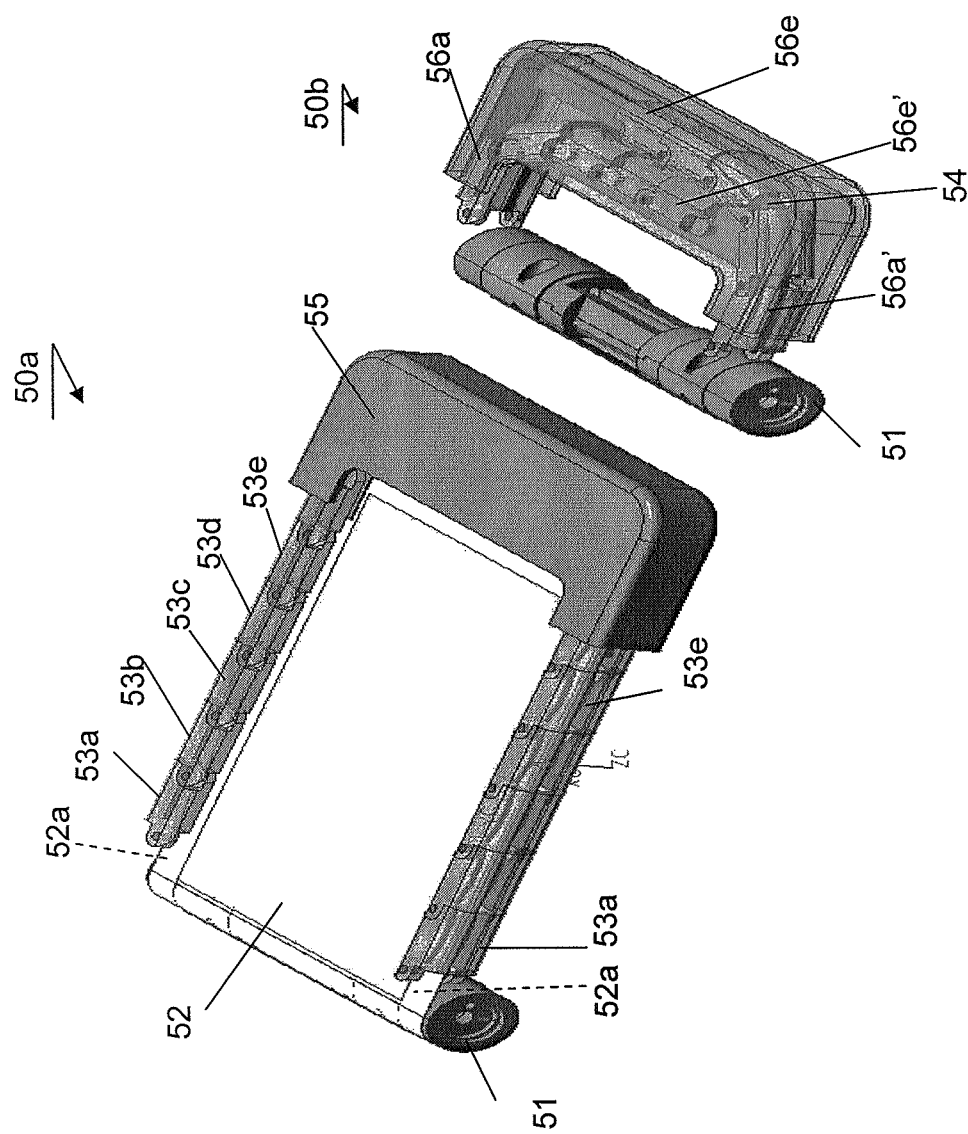
FIG. 5 presents a schematic view of a still further embodiment of the electronic device according to the invention.

FIG. 5 presents a schematic view of a still further embodiment of the electronic device 50 according to the invention. In the present embodiment the flexible display is arranged to be wound around a roller 51, whereas the edge protector comprises segments 53a, 53b, 53c, 53d, 53e conceived to receive the edge portion 52a of the display 52. The edge protector is arranged with rigid segments which are conceived to be stored in the housing 55 when in a collapsed state. It is noted that the segments 53a, 53b, 53c, 53d, 53e may be manufactured completely from a rigid material, so that openings 54 arise when the rigid segments are supposed to be bend for entering storage areas inside the housing 55. This feature is enabled by hinges interconnecting the segments. The storage position is schematically illustrated by segments 56a, 56c, 56d, 56a', 56b'.

Figure 6:
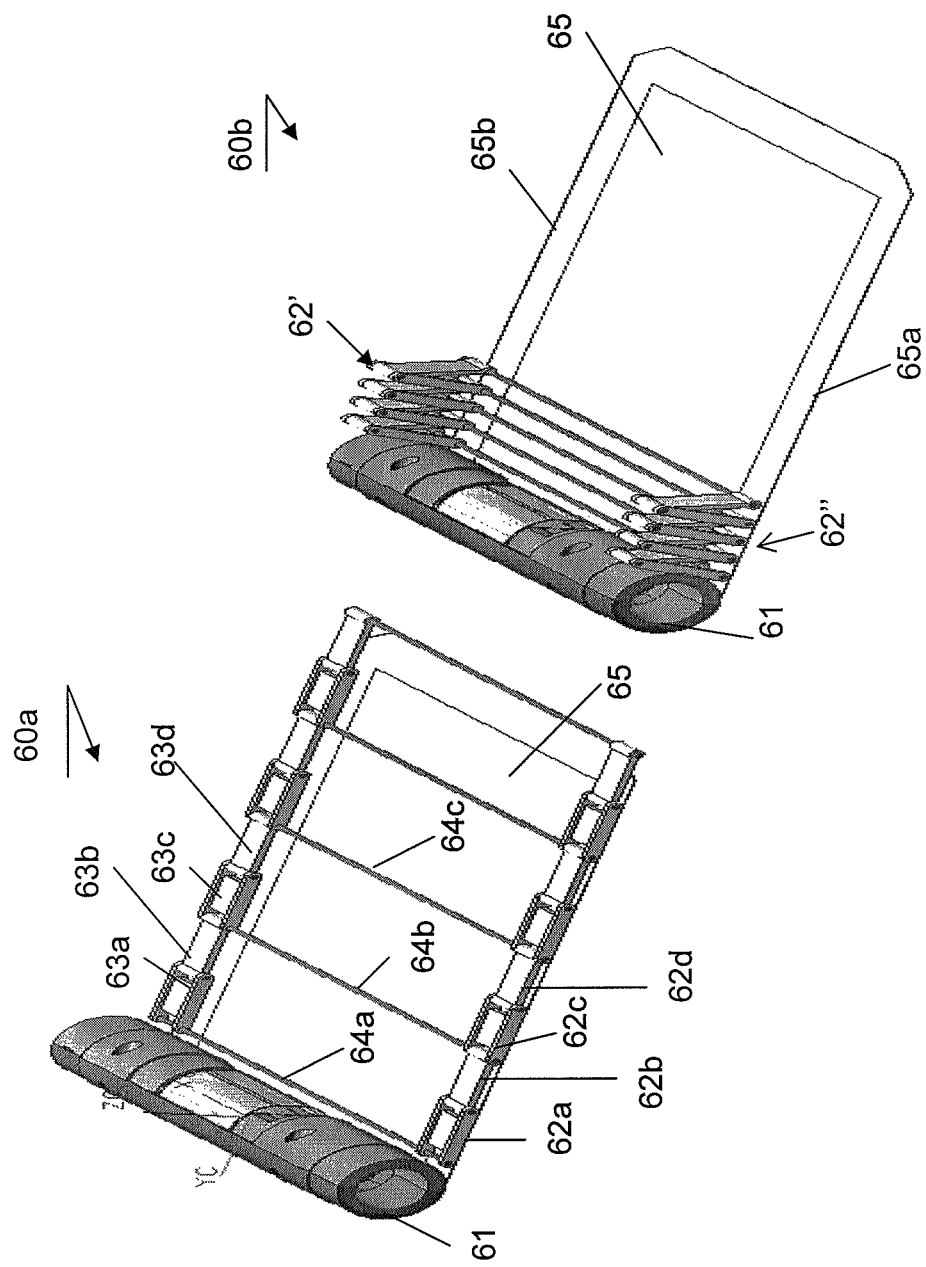
FIG. 6 presents a schematic view of a still further embodiment of the electronic device according to the invention.

FIG. 6 presents a schematic view of a still further embodiment of the electronic device 60a, 60b according to the invention. In the electronic device 60a the flexible display 65 is conceived to be wound about a roller 61. The edge protector comprises rigid segments 63a, 63b, 63c, 62a, 62b, 62c, 62c interconnected by suitable means 64a, 64b, 64c. Wiring, pins, bars may be used for interconnecting means 64a, 64b, 64c. In the embodiment 60a an extended position of the edge protector is shown. In the embodiment 60b a collapsed state of the edge protector is shown comprising aggregations of segments 62', 62". It is noted that in this embodiment the edge protector is arranged to be stored externally from the housing, preferably near the entry/exit port (not shown) for the display 65. This embodiment, being particularly easy to manufacture, is characterized by substantially reduced production costs. Furthermore, the bars 64a, 64b, 64c partly protect the back surface of the display.

Figure 7:
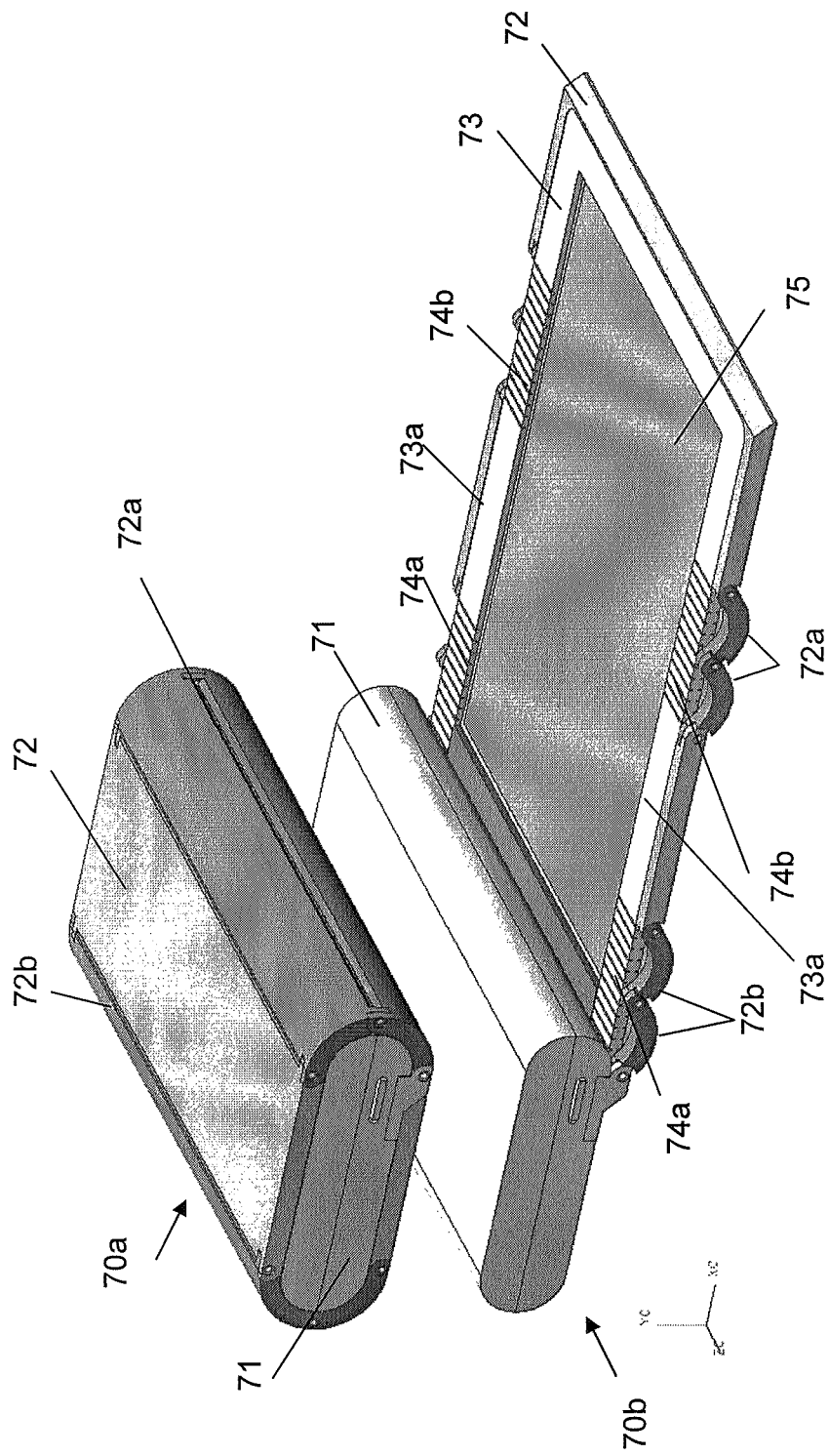
FIG. 7 presents a schematic view of a still further embodiment of the electronic device according to the invention.

FIG. 7 presents a schematic view of a still further embodiment 70a, 70b of the electronic device according to the invention. The electronic device 70 comprises a body of the housing 71 about which the flexible display 75 is arranged to be wrapped. In this particular embodiment, the housing 71 comprises a substantially rigid cover 72 arranged to receive the flexible display 75 and to be collapsed or extended together with it. For this purpose the cover 72 comprises hinged bending areas 72a, 72b not excluding single or multiple hinge solutions, particularly in this area. The electronic device 70 further comprises the edge protector 73 arranged with rigid portions 73a and with flexible portions 74a, 74b, not excluding a complete flexible solution at this area, the latter corresponding to hinged areas 72a, 72b of the cover 72. In this embodiment next to the side protection also a back protection of the flexible display 75 is provided. The edge protector is easy to handle and maintenance procedures can be carried out easily.

Figure 8A:
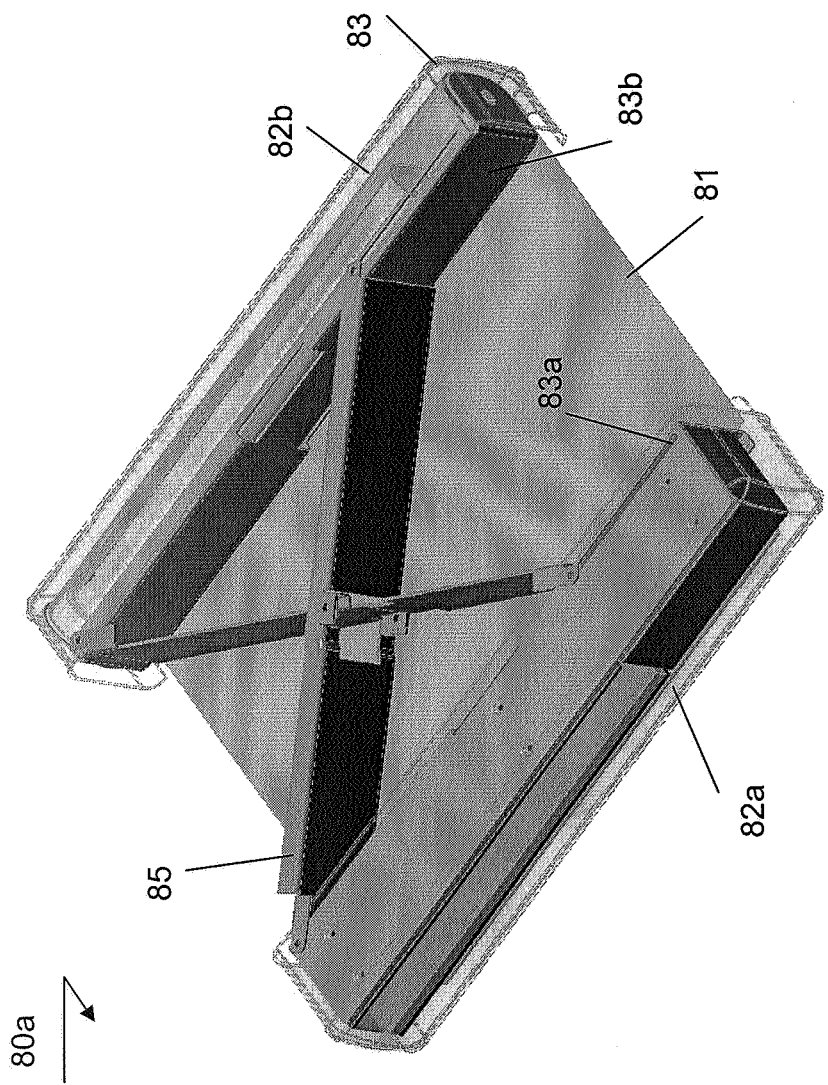
FIG. 8a presents a schematic view of a still further embodiment of the electronic device according to the invention.
Figure 8B:
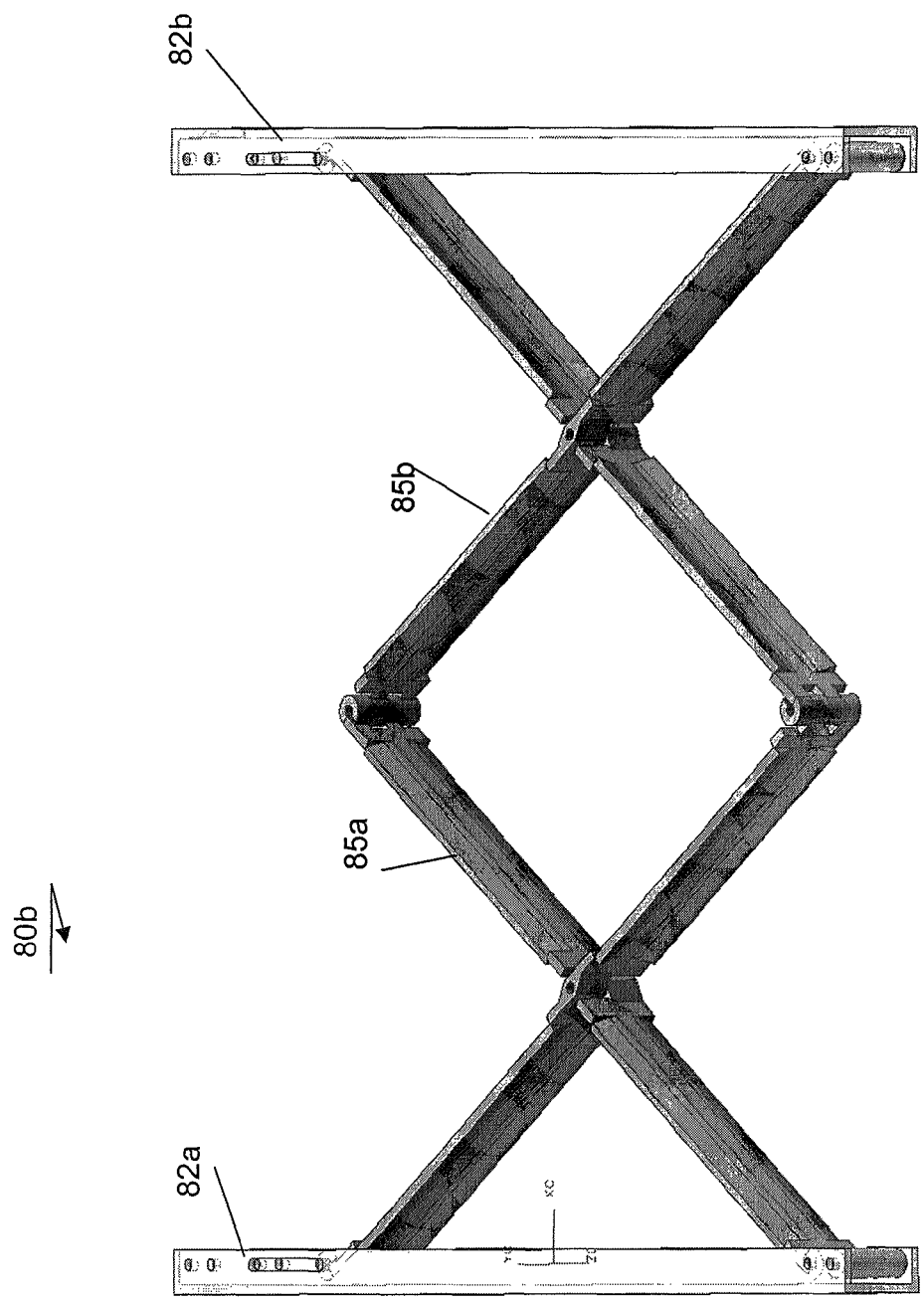
FIG. 8b presents a schematic view of a still further embodiment of the electronic device according to the invention.
Figure 8C:
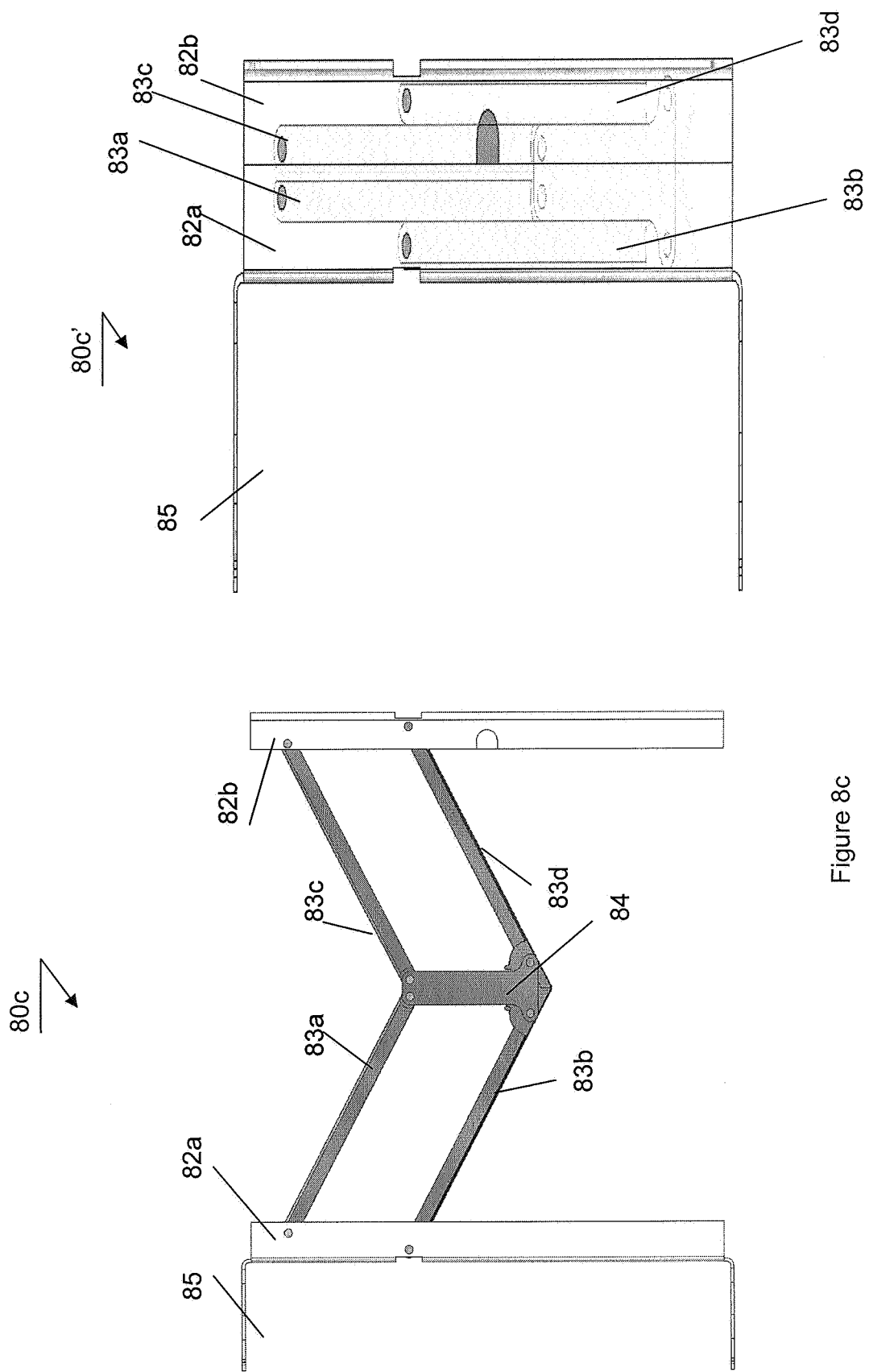
FIG. 8c presents a schematic view of a still further embodiment of the electronic device according to the invention.

FIG. 8a presents a schematic view of a still further embodiment of the electronic device according to the invention. The electronic device is further provided with a mechanism 80a arranged to cooperate with the flexible display 81. The mechanism 80a serves for guiding the flexible display 81 in one plane during extension and collapsing. The mechanism 80a is preferably a per se known scissor mechanism comprising two frames 82a and 82b and a X-shaped body 85 there between. One part of the frame, for example 82b may be attached to the housing 83, whereas the other part of the frame 82a may be used as a grip for operating the flexible display 81. In an embodiment of FIG. 8b a still further embodiment 80b of the electronic device according to the invention is shown. In this embodiment a plurality of X-shaped bodies 85a, 85b is used for increasing a range of extension of the flexible display. In FIG. 8c a schematic view of a still further embodiment of the electronic device 80c according to the invention is presented. Hereby the frame comprises two mutually parallel arms 83a, 83b, 83c, 83d interconnected by a bar 84. A suitable gear mechanism between leg 83b and 83d guarantees a substantially parallel movement of frame 82a and 82b. The view 80c' shows the mechanism in the collapsed state. It will be appreciated that the embodiments discussed with reference to FIGS. 8a-8c next to guiding the flexible display substantially in one plane also reduce a degree of freedom of the flexible display in any other direction thereby minimizing a chance of undesired deformation and thus damage of the flexible display. Furthermore the mechanism located on the back of the display partially protects the back surface of the display.

Figure 9:
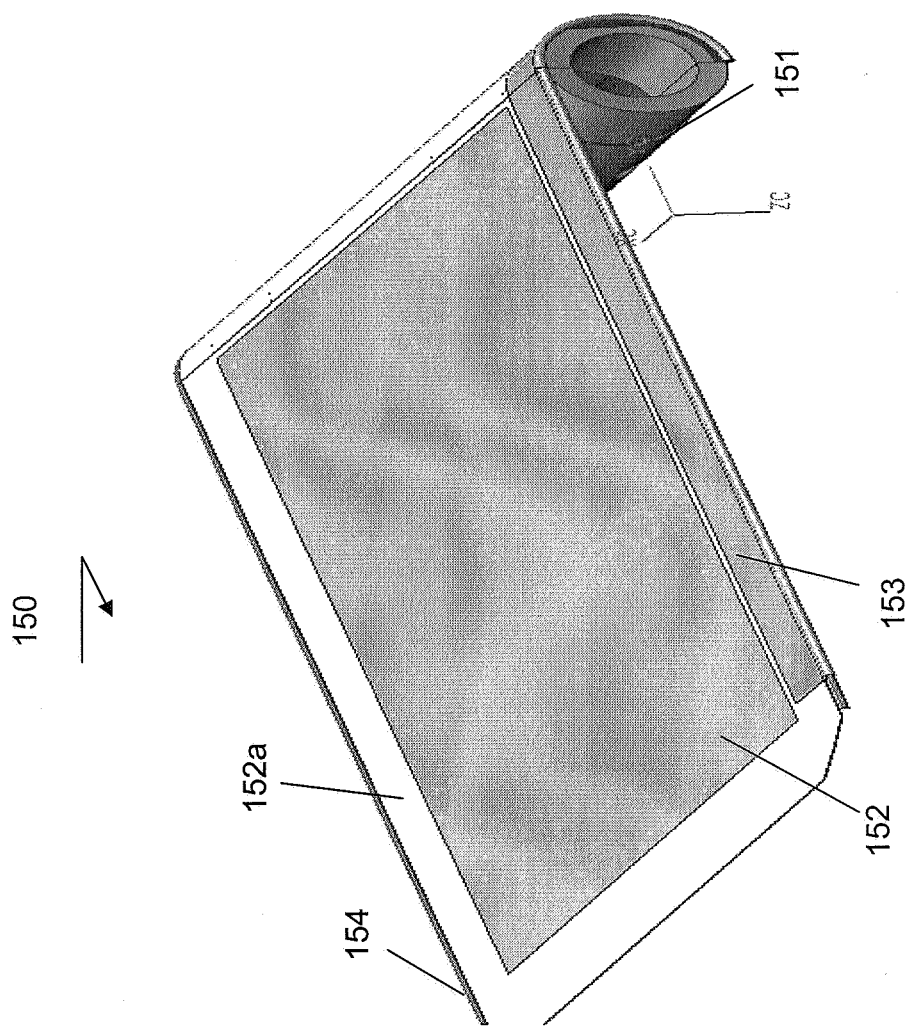
FIG. 9 presents a schematic view of a still further embodiment of the electronic device according to the invention.

FIG. 9 presents a schematic view of a still further embodiment 150 of the electronic device according to the invention. In this particular embodiment the flexible, notably rollable display 152, is provided with the edge protector 153 attached to the edge portions 152a (only one is shown for simplicity). The edge protector 153 further comprises a rigid wire 154 arranged substantially abutting the side face of the flexible display 152a. The rigid wire 154 is preferably selected form a rollable material being substantially stiff in a transverse direction. The stiffness can be acquired from the fact that the material is arranged under tension. Due to this feature undesirable bending of the edge portion of the flexible display is prevented. The wire 154 is flexible enough to be capable of wounding around the roller 151 together with the flexible display 152 upon storage.

Figure 10:
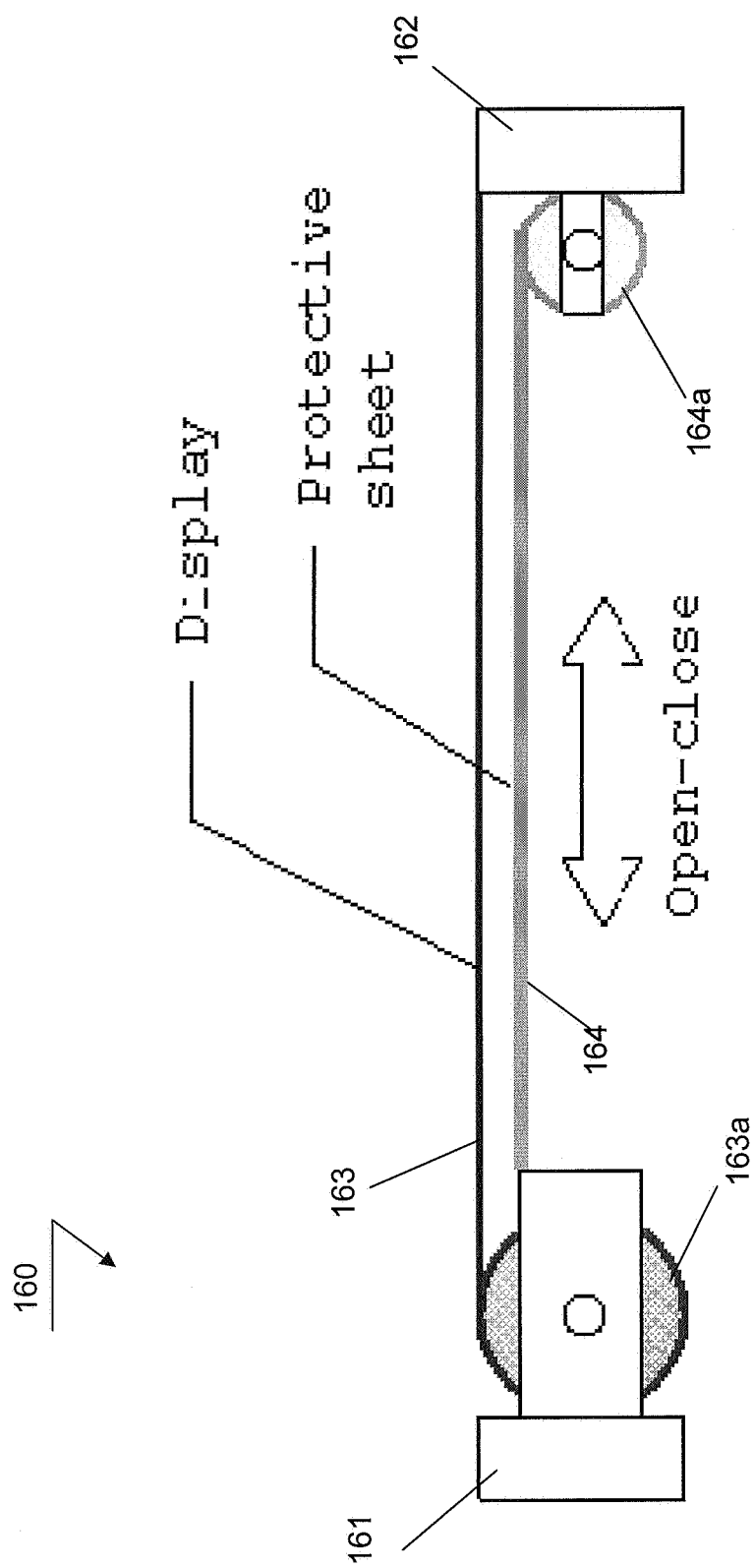
FIG. 10 presents a schematic view of a still further embodiment of the electronic device according to the invention.

FIG. 10 presents a further embodiment of the electronic device 160 according to the invention. A protective sheet 164 is arranged below the display. It is noted that his embodiment can be combined with any embodiments for protecting the side portions of the flexible display, as discussed anywhere in the foregoing. In this embodiment the sheet 164 is rolled up on a roll 164a, while the display 163 is rolled up on another roll 163a. An advantage of this solution is that the outer diameter of each roll can be kept small since each roll only needs to roll up one substrate. In general a flexible display has a minimum roll radius that is larger that the minimum roll radius of a protective sheet. This means that more space can be saved by making the radius of the roll for the protective sheet small. Another advantage is the fact that dust on the back of the roll system (particles) will not be rolled up together with the display, and therefore will not damage the display.

It will be appreciated that although specific embodiments of the electronic device according to the invention are discussed separately for clarity purposes, interchangeability of compatible features discussed with reference to isolated figures is envisaged. While specific embodiments have been described above, it will be appreciated that the invention may be practiced otherwise than as described. The descriptions above are intended to be illustrative, not limiting. Thus, it will be apparent to one skilled in the art that modifications may be made to the invention as described in the foregoing without departing from the scope of the claims set out below.

The invention claimed is:

1. An electronic device comprising:
    a flexible display arranged to be alternated between a collapsed state and an extended state, the flexible display comprising a first and a second edge portion extending continuously in a first direction on opposite sides thereof;
    a first edge protector comprising a plurality of rigid segments adjacently disposed along the first edge portion in the first direction; and
    a second edge protector comprising a plurality of rigid segments adjacently disposed along the second edge portion in the first direction;
    wherein adjacently disposed rigid segments are connected by a hinge so as to be foldable along the first direction, and wherein the first and the second edge protector are arranged such that when the plurality of rigid segments are folded, the flexible display between the first and the second edge protector is in the collapsed state.

2. An electronic device according to claim 1, wherein said plurality of rigid segments comprises at least one flexible portion conceived to be deformed during collapsing or extending the flexible display.

3. An electronic device according to claim 1, wherein the plurality of rigid segments are u-shaped for receiving at least a part of the corresponding first or second edge portion of the flexible display.

4. An electronic device according to claim 2, the flexible display being housed in a cover arranged to be wrappable around a body of the electronic device, the cover comprising said plurality of rigid segments provided with at least one flexible portion arranged at a position of cover deformation.

5. An electronic device according to claim 1, wherein the edge protector is arranged with a substantially rigid wire abutting a side face of the flexible display.

6. An electronic device according to claim 1, further comprising a mechanism for providing a substantially parallel guidance to the flexible display during collapsing and/or extending.

7. An electronic device according to claim 1, wherein the flexible device is arranged to be wound around a roller when in a collapsed state.

8. An electronic device according to claim 1, further comprising means for protecting a back surface of the flexible display.

9. An electronic display according to claim 8, wherein said means for protecting a back surface of the flexible display comprises a mechanism provided on the first and the second edge protector for providing a substantially parallel guidance to the flexible display during collapsing and/or extending, or a complementary roller comprising a protective material and being arranged to stretch the layer of protective material in synchronization with extension of the flexible display from the roller.

10. An electronic device according to claim 1, wherein in the extended state, each hinge of the first edge protector is disposed in alignment with a corresponding hinge of the second edge protector.

* * * * *